United States Patent [19]

Acharya et al.

[11] Patent Number: 4,504,909
[45] Date of Patent: Mar. 12, 1985

[54] METHOD OF USING AN ARRAY PROCESSOR FOR REAL TIME PROCESSING

[75] Inventors: Kishore C. Acharya, West Allis; Thomas J. Gilbert; Terry R. Griffie, both of Waukesha, all of Wis.

[73] Assignee: General Electric Company, Milwaukee, Wis.

[21] Appl. No.: 428,458

[22] Filed: Sep. 30, 1982

[51] Int. Cl.³ .......................... G01T 1/29; G06F 15/52
[52] U.S. Cl. .................................. 364/414; 364/200; 364/900; 378/901
[58] Field of Search ............... 364/414, 200, 900, 415; 378/4, 901

[56] References Cited

U.S. PATENT DOCUMENTS

| | | | |
|---|---|---|---|
| 4,107,773 | 8/1978 | Gilbreath et al. | 364/200 |
| 4,135,247 | 1/1979 | Gordon et al. | 378/901 |
| 4,149,243 | 4/1979 | Wallis | 364/200 |

OTHER PUBLICATIONS

Bacharach et al., "A Real-Time System for Multi-Image Gated Cardiac Studies", Journal of Nuclear Medicine, vol. 18, No. 1, pp. 79-84.

Primary Examiner—Jerry Smith
Assistant Examiner—Karl Huang
Attorney, Agent, or Firm—Leydig, Voit, Osann, Mayer & Holt

[57] ABSTRACT

A procedure for use with a data acquisition system and an array processor for real time processing of the acquired data. Rather than utilize the array processor in its normal mode to process one array before moving on to the next, processing of subportions of a given array is interleaved with inputting of acquired data sets for the next array. The size of the subgroup, the number of data sets in the array, the number of channels to be processed, the nature of the process to be performed and the speed at which it can be performed are balanced in such a way that (a) processing of a subgroup is completed at about the time the next set is ready for input, and (b) at the completion of processing of the last subgroup within a given array, the last set of the next array is ready for input, so that processing of the next array commences immediately.

6 Claims, 9 Drawing Figures

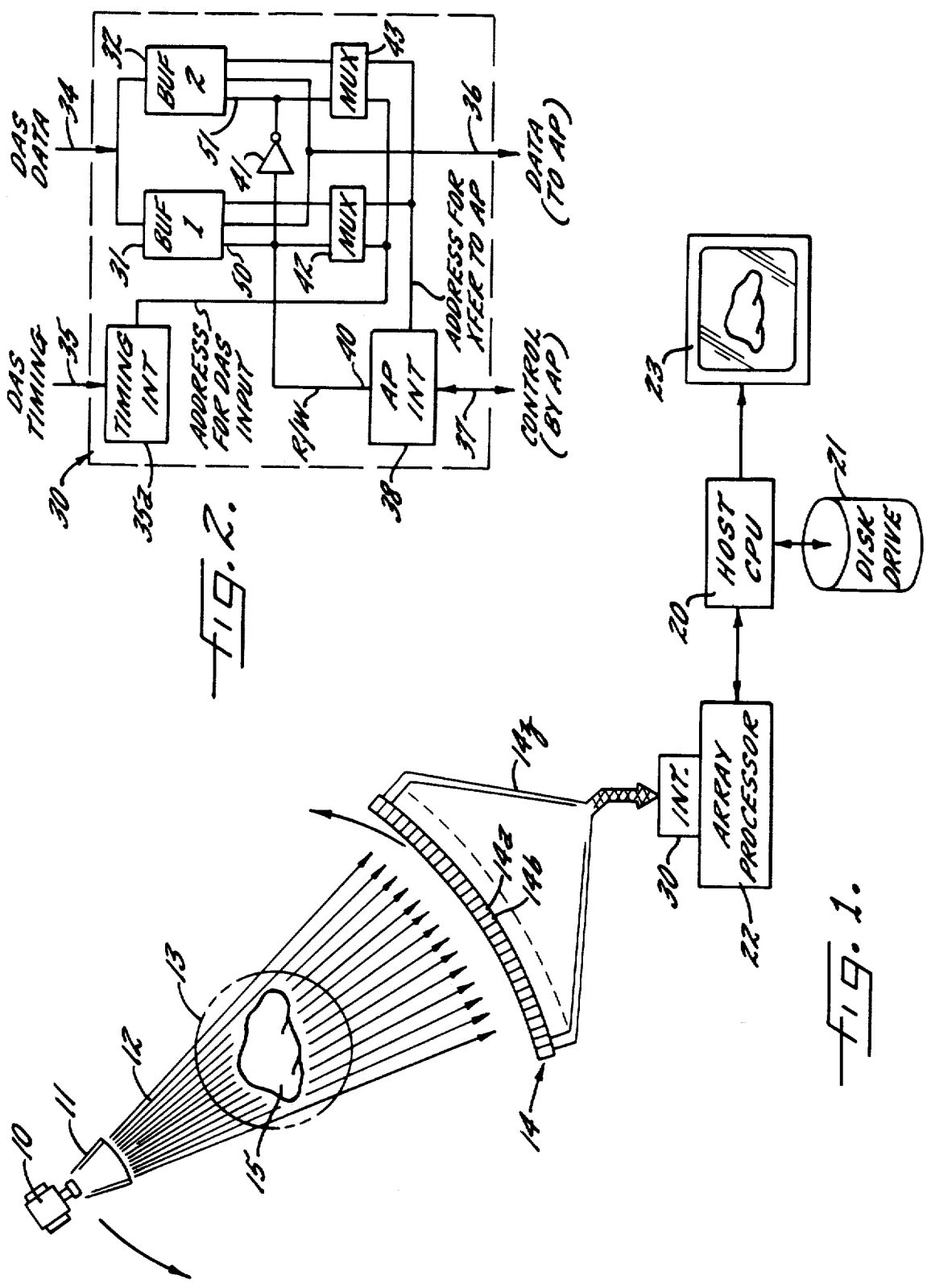

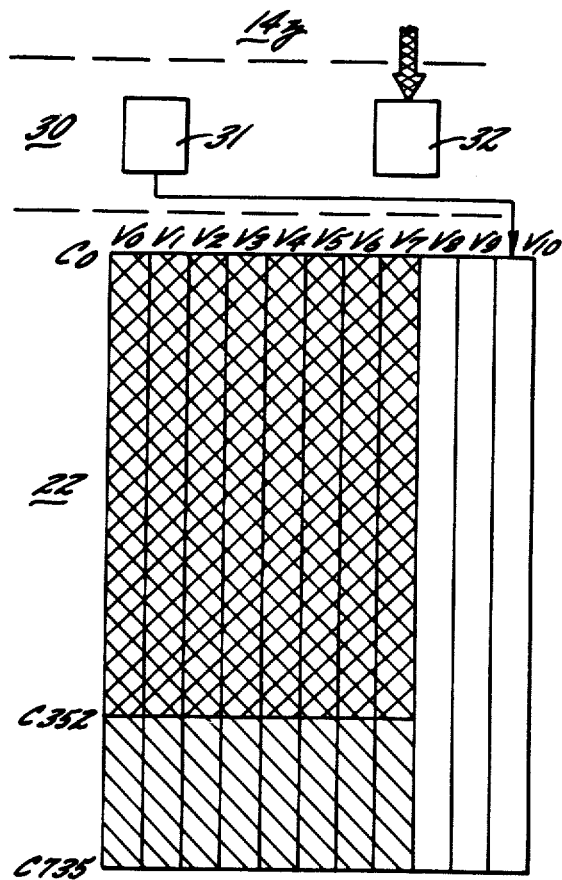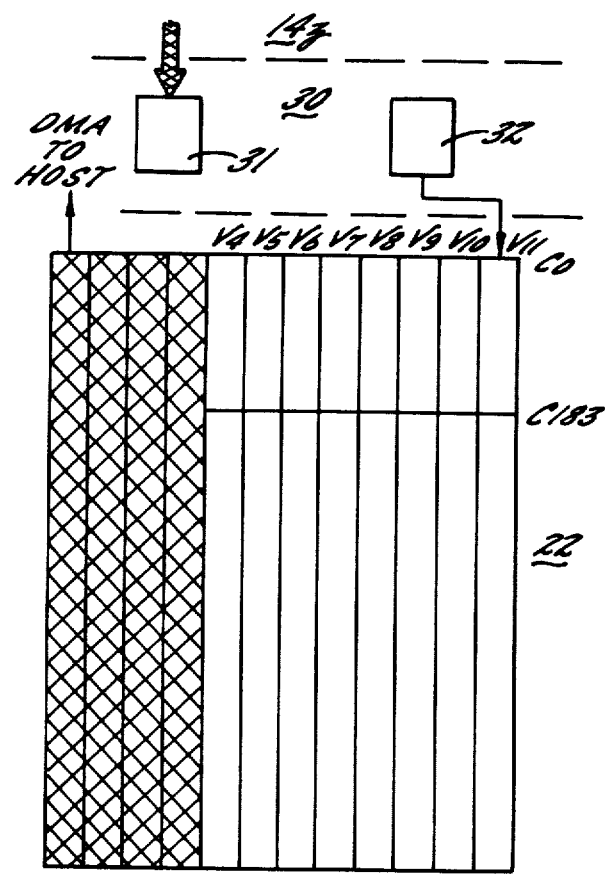
Fig. 4E.
Fig. 4F.

METHOD OF USING AN ARRAY PROCESSOR FOR REAL TIME PROCESSING

This invention relates to a procedure for real time processing of data and has an important application in processing of detector data in a CT scanner.

One of the important directions in which CT technology has been advancing is the production of better images, those containing more diagnostically useful information. An important factor in achieving better images is adequate resolution of the detector data itself, which enables the scanner to distinguish slight changes in body absorption with good spatial resolution. In addition, it is also useful to provide fast scan capabilities to minimize artifacts caused by body motion.

Those requirements have a direct impact on the acquisition electronics which convert the signals produced in the detector channels into digital form for processing by the reconstruction computer.

As late as 1981, a successful state of the art scanner had the capability of producing 576 views having 512 channel readings per view in about 9.6 seconds. That system was based on integrating the current produced in each detector cell, with the integrated magnitude then being digitized for use by the reconstruction computer. The x-ray source was pulsed at about a 60 Hz. rate, and the integrator period was set to be slightly greater than the duration of a pulse.

In order to further improve the images produced by that scanner, it would be desirable to increase the rate at which detector data could be acquired. That would allow not only faster scanning speeds, but also gathering of additional information from each scan for reconstructing better images.

In order to gain a significant increase in the rate of acquiring detector information, it is desirable to use a continuous-on (rather than pulsed) x-ray source, and to associate a sampled data system (rather than integrating electronics) with the detector channels. However, using a sampled data system with a modern high resolution detector having a large number of detector channels, raises the possibility of acquiring data faster than it can be stored. Typically, during the actual scan cycle, when the x-ray tube is on and the source and detector are rotating about the patient, the acquired data is input to the processor (where it may or may not be subjected to some minor initial pre-processing), but is promptly written to system disk so as to limit the amount of active computer memory needed for data acquisition. The speed at which the CT computer can write information to disk sets a limiting factor on how quickly data can be acquired. A typical rate using available computers is about 280,000 words per second. Two scanners of concern here have 512 or 736 channels per detector, and it is desirable to sample each of those channels at a one millisecond sampling rate. That produces in the first case a 512,000 word per second data rate and in the second case a 736,000 word per second data rate, both substantially higher than can be accommodated by the reconstruction computer.

In Glover et al. U.S. application Ser. No. 428,771 filed concurrently herewith and assigned to the same assignee as the present invention, there is disclosed and claimed a compensating digital filter which performs a number of functions. It provides amplitude and phase compensation for the analog filters in the data acquisition system to yield a more nearly ideal characteristic. Secondly, the digital filter is actually a plurality of digital filters with different band limiting functions to effectively adjust the composite filter cutoff characteristic to the bandwidth established by each of a plurality of different scanning rotation rates. Finally, that digital filter is capable of compressing the acquired detector data so as to effectively reduce the compressed data rate. For example, when operating in a 2:1 compression mode, the output data rate is effectively half the input data rate. The compression ratio can be selected to decrease the output data rate to a level acceptable to the reconstruction computer. Such digital filtering requires the real time processing of a large amount of data at a rapid rate.

Altekruse U.S. application Ser. No. 428761 filed concurrently herewith and assigned to the same assignee as the present invention, describes and claims a system architecture using the array processor normally found in the computational system and a special interface for real time processing of the detector data before passing it to the host computer for storage on the system disk.

The present application is related in that it describes a processing technique useful in adapting the array processor for such real time filtering at data rates which can be expected in practical applications.

In sampled data systems, it is also useful to maintain statistical data on the transducers or detectors and their acquisition electronics. Typically, mean and standard deviation criteria are calculated for each channel by collecting data over a relatively long interval (as compared to the sampling interval) followed by standard statistical computations. Usually, the data is acquired and stored for later computation. That requires, however, a large mass storage medium for temporary storage of the information and additional computation time for performing the calculation.

Both the real time filtering and statistical computation examples effectively reduce the amount of data to be stored. The problems they solve are related, but not identical; in the former case, the data rate is too high for storage by the system computer, while in the latter case the data volume is too great for convenient storage. But in both cases the problem is solved by real time pre-processing before storage.

In view of the foregoing, it is an aim of the present invention to use the array processor found in modern CT scanner architecture for real time processing of data in a way which will not interfere with the acquisition of that data.

More particularly, it is an object of the present invention to use the array processor to both acquire data in real time and to process it in real time before passing it to the host computer for storage. Further in that regard, it is an object to accomplish that data acquisition and processing at rates which take advantage of the high speed computational power of the array processor.

Other objects and advantages will become apparent from the following detailed description when taken in conjunction with the drawings, in which:

FIG. 1 illustrates a CT architecture useful in practicing the present invention;

FIG. 2 is a block diagram of the interface 30 of FIG. 1;

FIGS. 4A to 4F are diagrams useful in understanding the present invention.

Figure 3:
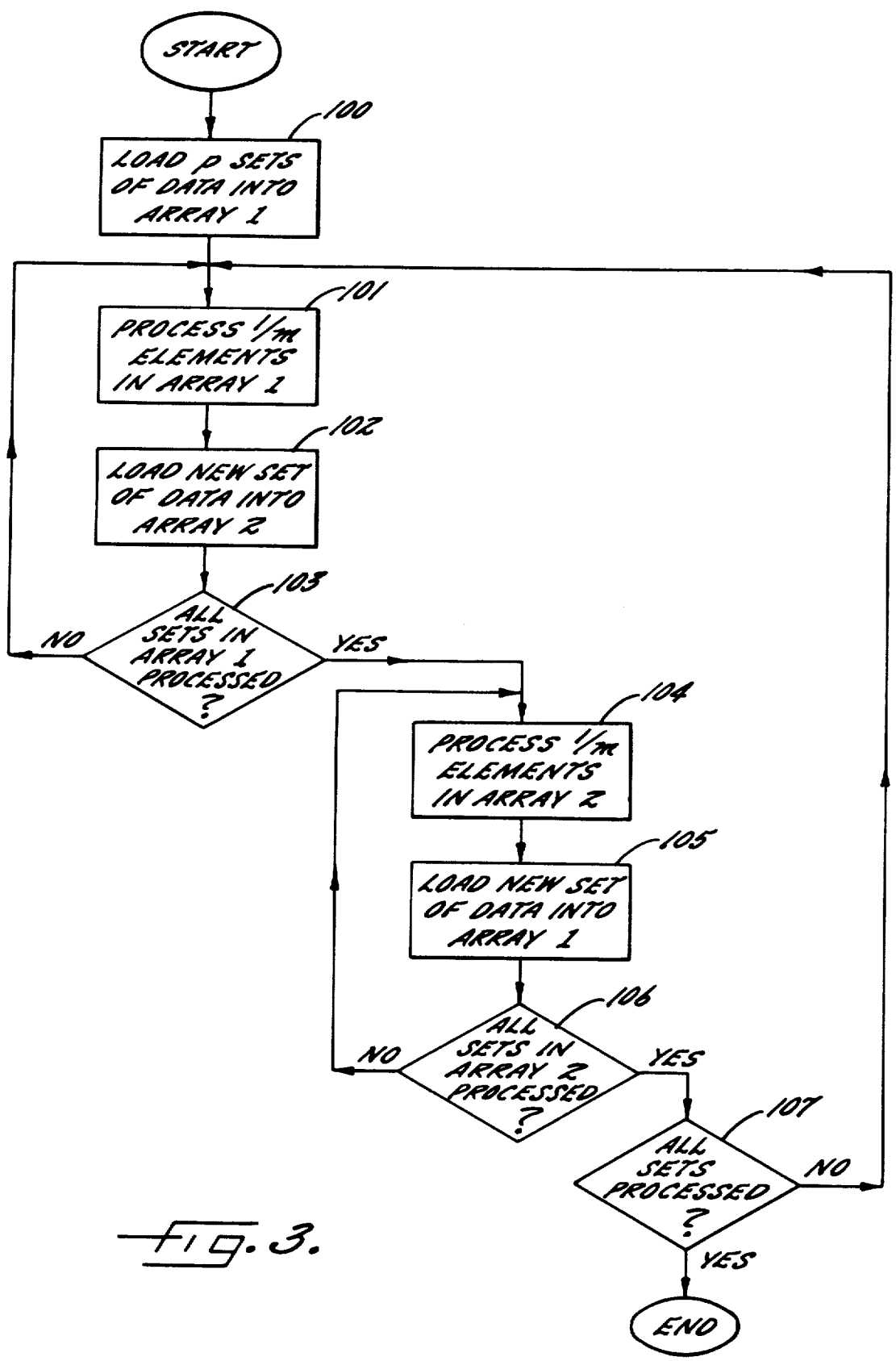
FIG. 3 is a flow diagram illustrating a processing procedure according to the present invention.

While the invention will be described in connection with certain preferred embodiments, there is no intent to limit it to those embodiments. On the contrary, the intent is to cover all alternatives, modifications and equivalents included within the spirit and scope of the invention as defined by the appended claims.

Turning now to the drawings, FIG. 1 schematically illustrates the major elements of a CT scanner and its associated computational system arranged for the practice of the present invention. The scanner includes a source of penetrating radiation 10, very often in the form of a rotating anode x-ray tube. The radiation produced by the x-ray tube 10 is collimated at 11 to produce a thin fan beam of radiation 12 which is projected through a patient aperture 13 toward an x-ray detector array 14. A body to be examined, such as a patient 15, is positioned within the patient aperture 13 in the path of the fan beam of x-rays 12 such that the beam passing through the body is attenuated in dependence on the density of the objects encountered. As a result, each detector cell 14a, 14b, etc. produces an electrical signal which is dependent on the intensity of the radiation received within the cell. Such x-ray readings are taken from each cell at a plurality of angular positions with respect to the patient, as the source and detector array are rotated about the patient aperture.

Each set of readings is referred to as a view, and each view is made up of a number of elements or channel readings, one for each channel. The readings are digitized then stored for further processing. Because there is relatively large amount of data acquired, storage typically takes place on system disk 21. After a complete set of views is acquired, during the time the system is computing the image, the data can be retrieved from the disk 21 as necessary. The computed image is then displayed on a CRT 23 under control of the host CPU 20.

FIG. 1 illustrates the architecture described and claimed in the aforementioned Altekruse application, the disclosure of which is incorporated herein by reference. The digital filtering operation which it can perform is described more fully in the aforementioned Glover et al. application and that disclosure is also incorporated herein by reference. In the example described in the Altekruse application, the data acquisition system DAS 14z took a view or sampled each channel at a one millisecond rate. Two types of detectors were discussed, one having 512 channels and the other 736. As a result, the data rates of 512,000 words per second and 736,000 words per second were output from the DAS. Because that rate was higher than could be accepted by the host computer, the data was transferred via an interface 30 directly to the array processor 22 for preprocessing. A filtering operation was applied to compress the data, in effect reducing the number of views output to slow the data rate to a rate compatible with the host CPU which received and stored it. Compression rates as low as 2:1 and as high as 8:1 have been utilized successfully.

Typically the array processor is used in a CT scanner in the reconstruction process where arrays of data are sent to the array processor by the host computer, computations are performed on the arrays in the array processor, and the results of the computation returned to the host computer. The array processor is a "pipeline" type of computer which is particularly suited to recursive types of computations where outputs from one step are used as inputs for computations in a succeeding step.

As a result, it is typical to pass all the data that is needed to the array processor before it begins its computation. In the architecture illustrated in FIG. 1, the array processor itself is also directly involved in the data acquisition phase of scanner operation. The array processor must therefore make itself available to receive data from the DAS interface 30 when it is available; if the array processor does not, the data will likely be lost.

The hardware configuration described in the Altekruse application accommodates those requirements by providing a pair of buffers (see FIG. 2) 31, 32 made alternately available to the DAS and to the array processor, such that as the DAS is filling one, the array processor is emptying the other. In one embodiment, the buffers are each capable of storing 1,024 words of 16 bits each.

The DAS data is input to the interface 10 on a 16 bit bus 34 which is coupled to the input of both buffers 31, 32. Similarly, DAS timing is input on a line 35 to a timing interface 35a. A further bus 36 conducts output data from a selected one of the buffers 31, 32 for input to the array processor. In addition, a bus 37 allows the array processor to control the interface by means of an array processor interface section 38.

The array processor interface section 38 controls the signal level on a read/write line 40 which is used to control the availability of the buffers as well as the addresses for the buffers. It is seen that the read/write line is connected directly to the read/write input 50 of buffer 31, and via an inverter 41 to the corresponding input 51 of buffer 32. Thus, one of the buffers is always available to read data out to the array processor, while the other is available to write data in from the DAS. The multiplexers 42, 43 are also controlled by the read/write signal and inverted read/write signal so that they are also in opposite conditions. One set of inputs to the multiplexer 42 is derived from the array processor interface 38, and comprises addresses for the data to be transferred to the array processor. In practice, a counter within the array processor interface section 38 simply sequences through the buffer addresses as data is transferred to the array processor. The second set of inputs to the multiplexers 42, 43 is derived from the timing interface 35a and comprises addresses for sequential locations in the buffer for input of data from the DAS. A similar counter within the interface portion accomplishes sequential addressing.

In practice, after the array processor sends a group of instructions to the interface 30 for initial set-up, the data is passed through the interface in accordance with those preset parameters. The buffers 31, 32 are alternatively made available to the DAS for input of data as it is generated, and later made available to the array processor which accepts each view in turn in accordance with its preset sequence. The array processor unloads the buffers in such a way that the danger of losing raw data is minimized. In addition, the compressive nature of the digital filtering process produces an output data rate from the array processor which is compatible with the host CPU's ability to store the data to disk.

According to the present invention, a procedure is provided which employs the architecture illustrated in FIGS. 1 and 2 in a fashion to best utilize the time during which a new view is being acquired for processing previously acquired views, maximizing the efficiency of the overall system. In effect, the processing of the data is geared to the rate of acquisition, the nature of the process, and the compression factor in order to assure that the array processor is ready to acquire new data before it is lost in the interface.

The present invention is based in part on the fact that certain non-recursive types of computations are useful in a CT scanner, and in performing those, particularly in real time, the array processor need not complete the computation before going on to another process, such as input/output. In practicing the invention, rather than completely processing an array before going on to the next operation, the array processor only partially processes the array and intersperses that processing with I/O functions, so as to keep up with the real time data rate. As a result, it is possible to alternate between processing of an array, inputting of views for a succeeding array when they are acquired, and outputting of computed results to the host. The invention provides a procedure whereby those steps are intertwined in such a way to make the array processor always available to receive a buffer of data when it is ready.

The problem involves processing a number of multi-element sets of data where the process requires summation of corresponding elements from a number of sets, but where the sets are acquired in sequential fashion. The invention provides a method whereby processing of previously acquired sets and acquisition of subsequent sets can proceed in parallel. Thus, contrary to the normal use of an array processor where a complete array is presented to the array processor and completely processed, the invention provides a method whereby acquisition of the array can proceed in conjunction with processing of previously acquired portions of the array.

A general expression governing the type of process in question can be stated as:

$$Y_{i,j} = \sum_{k=0}^{p-1} a_k x_{mi-k+p-1,j} \quad (1)$$

$$i = 0, 1, 2 \ldots N - 1$$
$$j = 0, 1, 2 \ldots M - 1$$

where $Y_{i,j}$ is the value of the $j^{th}$ element in the $i^{th}$ output data set;

$a_k$ is the $k^{th}$ element of a constant array;

$x_{i,j}$ is the $j^{th}$ element of the $i^{th}$ data set;

m is a compression factor; and p is the number of input sets required in order to process an output set.

The present invention is useful when the data acquisition rate is sufficiently high that the above-identified computation cannot be performed for all channels of p input data sets during the acquisition time for a single set. In overcoming that problem, we have realized that computations of the type set out above are non-recursive in nature and thus, halting the process before completion does not create undue problems even though the array processor is a "pipeline" type of computational device. Furthermore, we have appreciated that the compression factor m provides an important criteria in determining how the processing and input/output operations should be subdivided. More particularly, in practicing the invention, we create subgroups of channels for processing, each subgroup being equal in number to the total number of channels divided by the compression factor m. We then proceed to interleave processing of each subgroup with input of a subsequently acquired data set, and arrange to perform the processing with sufficient speed that processing of a subset takes slightly less time than input of a new data set into one of the FIG. 2 buffers. As a result, at the completion of processing all m subgroups of an array, m new views have been input to the array processor and are ready for processing. At that point, the oldest m views are no longer needed and the memory locations which they occupy are available to be overwritten.

The process is better understood with reference to the flow chart of FIG. 3. The process commences with a set-up step 100 by loading p sets of data into memory locations in the array processor defined as array 1. It will be appreciated that the array processor accomplishes this set-up step by emptying buffers 31, 32 from the interface 30 as it determines that they are filled by the DAS. After p sets of data are loaded, and while the DAS is transferring the next view into the interface buffer available to it, processing begins in the array processor at step 101. The non-recursive expression set out above as equation 1 is applied to all p sets of data in array 1, but only to a fractional subgroup of the channels for those sets. The fraction is taken as the inverse of the compression factor. Thus, if the system is using an 8:1 compression factor, only the first 1/8th of the channels for the p sets are processed. The nature of the process and the speed with which it is performed are optimized to assure that the process for the 1/m elements is completed first before the DAS has loaded a new view into the interface buffer. Step 102 is then performed to test the interface and if a view has been completely loaded into a buffer, to transfer that view into the array processor in memory locations defined as array 2. A test 103 determies whether all m subgroups of data in array 1 have been processed and if not, returns to step 101 to process the next subgroup of channels. Shortly after that subgroup is processed, the next view should be available in the interface, and it is loaded in array 2. The test 103 is repeated to alternate processing of 1/m channels and loading of views until all of the subgroups have been processed by the step 101. Because a view has been loaded into array intermediate each processing step, array 2 is now full and ready for processing. Accordingly, the test 103 then routes the process to step 104 to begin processing the first subgroup in array 2, while a step 105 begins to fill array 1 with newly acquired views. The test 106, like previous test 103 continues to cycle this loop until array 2 is processed and array 1 is filled. At that point, a test 107 transfers operation back to the loop containing steps 101 and 102 for processing of array 1 while filling array 2. The procedure continues until the DAS stops transmitting data, following which the step 107 determines that all sets have been processed and concludes the procedure.

As will become apparent in considering the following two examples of application of the process, in some cases it is desirable to retain the results of the process within the array processor until test 107 concludes the operation. In other cases, it is desirable to transfer the results to the host shortly after an array has been processed. In those cases, the results can be sent via DMA operation to the host as time is available between processing the next array and inputting additional views. The DMA rate can be adjusted to assure that processing time in the steps 101, 104 remains shorter than acquisition time for a view, so as to prevent loss of data in the interface.

A very significant application of the present invention is in connection with digital filtering of DAS data in real time during the data acquisition phase of CT scanner operation. The technique taught here makes it possible to use the array processor which is an element of the standard CT architecture for real time filtering of DAS data with very high data rates and with a reasonable number of terms in the filter kernel. Thus, the instant technique extends the capabilities of the array processor to bring its significant processing power to bear for non-recursive computations in the real time processing environment.

The statement set out earlier as equation 1 describes the process performed for digital filtering where the generalized terms described there are more specifically applied in this example as follows: y represents the output view, x represents the input view, a is the array of filter coefficients, and p is the number of terms in the filter. The process will be further described with reference to an example in which m will be taken equal to 4 to produce a 4:1 compression; p, the number of terms in the filter, will be taken equal to 8; N, the number of output views, will be taken equal to 1,000; and M, the number of channels, will be taken equal to 736. With those values, the statement for the process to be performed is as follows:

$$y_{i,j} = \sum_{k=0}^{7} a_k X_{4i+7-k,j} \quad (2)$$

$$i = 0, 1, 2 \ldots 999$$
$$j = 0, 1, 2 \ldots 735$$

With the system operating at a 1 millisecond sampling rate, a view comprising 736 data words is ready in the interface buffer every millisecond and must be taken promptly or it will be lost. Data acquisition continues for four full seconds during which 4,000 such views must be acquired and processed to produce 1,000 output views. Since the number of channels is equal to 736, and since a compression factor of 4 is used, each subgroup comprises 184 channels of 8 views. The processing rate must be made fast enough to complete processing of that amount of data within a subgroup in less than the 1 millisecond required to acquire the next view. Because the number of filter terms is greater than the compression ratio by a factor of 2, each input view contributes to two output views; thus, this process demonstrates "overlapping" arrays in the array processor where the filter is incremented by only half the number of views as it has terms.

FIGS. 4A-4F are useful in illustrating the manner in which processing and I/O are interleaved to accommodate the time constraints which are established by the DAS. FIGS. 4A-4F are intended to schematically represent the flow and processing of information from the DAS to the array processor memory. The DAS itself is above the line 14z, and the arrows illustrate the views being produced and sent to the computational system at the aforementioned 1 millisecond rate. Only the buffers 31, 32 are shown in the interface 30, and the arrows from the DAS and to the array processor indicate whether they are writing from DAS to reading to array processor at particular stages of the sequence. The array processor section 22 illustrates a portion of the data memory in which are stored the views of data to be processed.

Figure 4A:
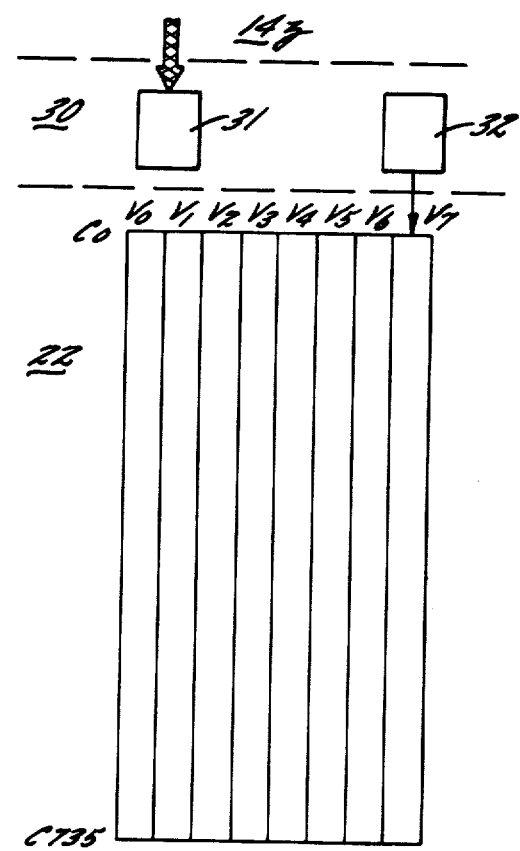

FIG. 4A illustrates the condition at about the termination of set-up at which time the previously loaded buffer 32 is transferring a view via DMA operation of the array processor for filling 8th slot in the data array. The alternate buffer 31 has just been made available to the DAS 14z to receive a new view therefrom. The vertical channels in the array labeled $V_0$-$V_6$ illustrate the first seven views which had been input in previous cycles from the buffers 31, 32. The $C_0$ and $C_{735}$ indicia at the top and bottom of the array indicate that all 736 channels for each of the eight views $V_0$ and $V_7$ are stored in the array. Each intersection between a channel position $C_x$ and a view position $V_x$ represents a digital data word stored in the array.

Figure 4B:
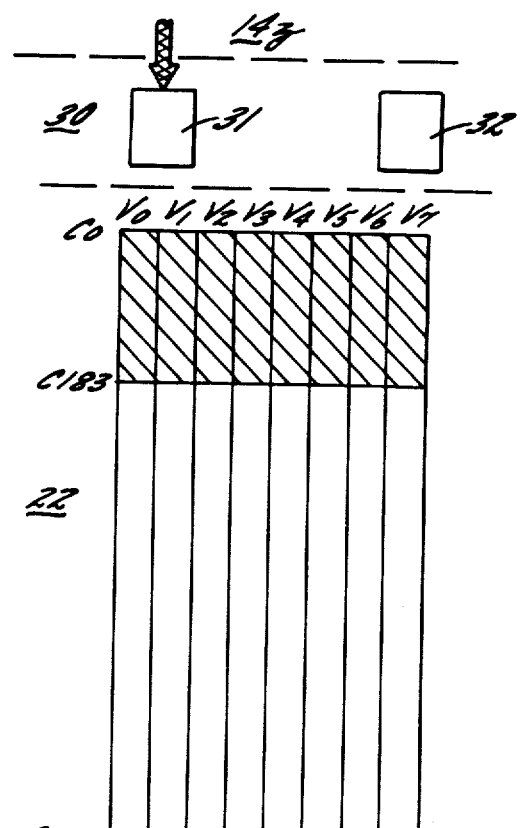
Figure 4C:
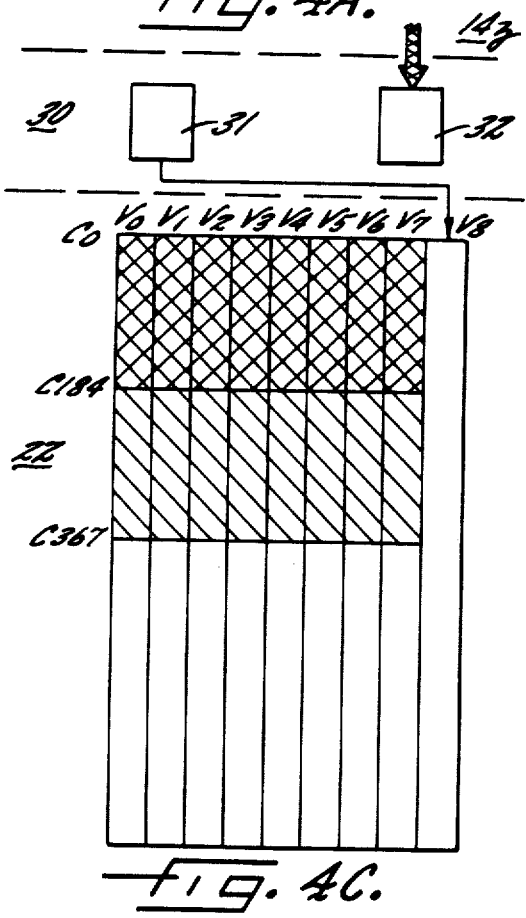

Immediately after the view $V_7$ is input into its slot in the array, processing can commence. Recalling that a compression factor of 4 is utilized, it will be appreciated that the array is divided into four sub-sets for individual processing. FIG. 4B represents the processing cycle which takes place after set-up under the assumed conditions. The 8-bit fitlter $a_k$ is applied to the eight views in each channel position in turn, beginning with channel 0 to produce a processed output y for each channel. That result is stored in an available location in memory, illustrated for convenience as the position previously occupied at $C_0V_0$. The filter is then applied to the eight views for the channel position $C_1$ and the result stored at $C_1V_0$. Processing continues until the subgroup is completed. Under the assumed conditions, that occurs after processing channel $C_{183}$ and storing the result at $C_{183}V_0$. At that time, a subgroup of the channels has been processed which is in size equal to the total number of channels divided by the compression factors. That condition is illustrated by the cross-hatching in FIG. 4B. The processing itself is so arranged that all of the 184 channels are completed in less than the 1 millisecond it takes for the buffer 31 to receive a full view from the DAS, in the present example, 1 millisecond. After channel $C_{183}$ has been processed, the system then changes into the mode illustrated in FIG. 4C. The newly filled buffer 31 transfers its acquired view to fill view position $V_8$ in the array, while the buffer 32 is made available to the DAS to receive view $V_9$ as it is generated. View $V_8$ is simply stored to await further processing while the process (equation 2) is applied to the second subgroup of channels spanning channel $C_{184}$ to channel $C_{368}$. The double cross-hatching in the first group of channels illustrates that they have been completely processed while the single cross-hatching in the second group of channels illustrates that those channels are being processed while the buffer 32 is being filled.

Figure 4D:
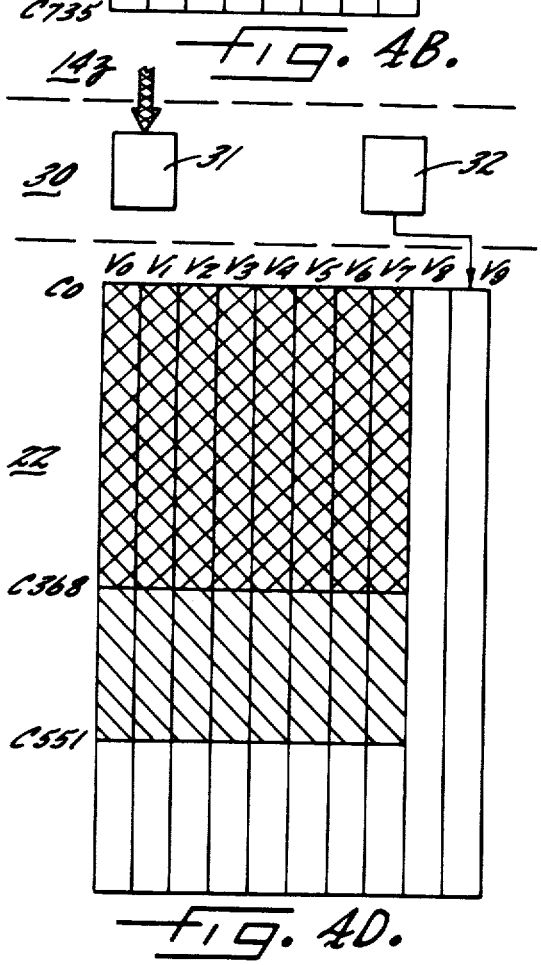

In similar fashion, after channel $C_{367}$ is processed, the array processor then tests the interface 30 to determine if buffer 32 has completed filling. If it has, as illustrated in FIG. 4D, view $V_9$ is loaded into an available space in the array, and buffer 31 made available to the DAS. After view $V_9$ is stored, views $V_8$ and $V_9$ continue to await processing while the array processor completes the next subgroup within the array established by views $V_0$ to $V_7$. The third subgroup encompasses channels $C_{368}$ to channel $C_{551}$. Processing is as in connection with the previous subgroups and the results are stored at appropriate locations. In a similar fashion, the system switches to the FIG. 4E configuration where view $V_{10}$ is loaded into a slot when ready to await further processing and buffer 32 made available to the DAS. The final subgroup of channels is then processed comprising channels $C_{532}$ to $C_{735}$. After processing the last channel $C_{735}$ and storing its result in an appropriate location such as $C_{735}V_0$, just as in the previous cases, the array processor toggles the use of the buffers to make buffer 31 available to the DAS and to load the view $V_{11}$ in buffer 32 into the next available slot in the array. The double cross-hatching in the area occupied by views $V_0-V_3$ indicates that processing is complete with respect to those views and they need no longer be retained. One of the view locations in the array, or some other convenient memory location, contains the results of processing, i.e., an output view, and as indicated by the arrow, that information is sent by DMA to the host as time is available. It will be appreciated from FIG. 4F that the array comprising views $V_4-V_{11}$ represents an array of eight views ready for processing, as did FIG. 4A; accordingly, the system then processes the first quarter of the values as illustrated in FIG. 4B, and continues cycling through those operations, using DMA cycles to send processed views to the host at a rate it can accept until all 4,000 input views have been stored and processed resulting in the output of 1,000 views to the host for storage on the disk. it is that information which is later recalled by the reconstruction programs for producing an image derived from the data input by the DAS.

Using a microcoded computation to carry out the process of equation 1, the total loop timing, that is, the timing for processing one subgroup of channels is set forth in the following expression:

$$L_t = \left[ 2M + \frac{p+1}{m} N \right] aT \qquad (3)$$

where $L_t$ is the total loop timing;

T is the processor cycle time; and a is a factor greater than 1 which takes into account the effect of DMA operation on the processing time. In that expression, 2M takes into account the time required to read data from the interface into its slot in the array processor memory. The factors M the number of channels in the detector, p the number of terms in the filter, and m the compression rate, are coordinated to the sampling rate of the DAS such that the total cycle time $L_t$ is less than or equal to the sampling interval. In addition, the parameter a is determined by the DMA rate so that control of the DMA rate can be used to adjust loop timing.

In systems configured thus far, in order to limit the amount of computation in the digital filtering operation, it has been desirable to limit p, the number of terms in the filter, to 2m, twice the compression factor. While that is desirable for certain applications, it is obviously not a requirement for the more general practice of the invention.

In summary, processing according to the procedure just described has accepted a data rate of 736,000 words per second for a period of 4 seconds, and has reduced the output data rate to only 184,000 words per second, a rate acceptable to the host CPU. In addition, it has accomplished that in a real time environment with timing dictated by a completely external data acquisition system. The data acquisition system operates at a known rate, and the processing speed of the array processor is geared to that rate such that it can interrupt its primary processing function and be ready to accept data from the DAS before it is lost in the interface, and with assurance that an empty buffer will be made available to the DAS for receiving the new view. And processing and input/output are interleaved in such a way that there is no lost time after completion of processing of one array, because at that point, the array processor performs an input cycle, and the view which is input completes the new array which is then ready for immediate processing.

A second species of the invention described herein relates to performing a statistical analysis in real time on the detector channels and their associated data acquisition system. That is a procedure typically employed to measure the performance of the system "front end" which produces the digitized samples for processing. Usually mean and standard deviation criteria are calculated for each channel for a period of time which is long as compared to the sampling interval. Conventionally, data collection and processing would be separate operations, such that during the course of a scan for say 8 seconds, data from each channel would be collected at the sampling rate and stored on disk. After the scan, the data would be recalled and subjected to a standard statistical computation. Employing that procedure requires a large mass storage area to be made available, and additional computation time to recall the data and make the computation.

In applying the present invention to the statistical information problem, a modified computation is carried out in real time as the data is acquired such that at the end of the scan summation results for each channel are available which can readily be processed in a computation to produce mean and standard deviation information on a channel-by-channel basis.

Well known statements for computation of mean $\overline{X}_j$ and standard deviation $S_j$ are set out as equations 4 and 5 below:

$$\overline{X}_j = \frac{1}{N} \sum_{i=0}^{N-1} X_{i,j} \qquad (4)$$

$$S_j = \left[ \frac{1}{N-1} \sum_{i=0}^{N-1} (X_{i,j} - \overline{X}_j)^2 \right]^{\frac{1}{2}} \qquad (5)$$

$$j = 0, 1 \ldots M - 1$$

In those expressions, N represents the number of arrays, e.g., the number of views, and M represents the number of elements or channels in a view.

In theory, it would be possible to accumulate the two summation terms in equations 4 and 5 on a running basis in real time as the data is acquired. However, attempting to implement a system in that way would encounter at least two problems. First of all, is the probability of data overflow in the running sum and running sum of squares, and secondly, the computational speed of the computer employed might be too slow to perform the necessary computations within the sampling interval.

A typical solution to the overflow problem is to increase the word length, which generally is achieved by using double precision arithmetic. However, that is counterproductive with respect to computational speed because the double precision arithmetic requires twice the computation time as well as twice the storage capacity.

In practicing this aspect of the present invention, we have retained the ability to use single precision arithmetic by subtracting an integer constant from each data word to avoid overflow, and by interleaving processing and input/output in the manner described above to accommodate the sampling rate.

The expressions for the two running sums which are accumulated in real time during the data acquisition phase are set out in equation 6 and 7 below:

$$X_j = \sum_{i=0}^{N-1} (X_{i,j} - A_j) \quad (6)$$

$$Y_j = \sum_{i=0}^{N-1} (X_{i,j} - A_j)^2 \quad (7)$$

$$j = 0, 1, \ldots M - 1$$

After all data is acquired, those running sums are used to compute the mean and standard deviation using the following expressions:

$$\overline{X}_j = \frac{X_j}{N} + A_j \quad (8)$$

$$S_j = \left[ \frac{N}{N-1} \left[ \frac{Y_j}{N} - \frac{X_j^2}{N^2} \right] \right]^{\frac{1}{2}} \quad (9)$$

$$j = 0, 1, \ldots M - 1$$

The running sums are maintained on a channel-by-channel basis, and after data acquisition is completed the running sums are used in equations 8 and 9 to calculate means and standard deviation criteria for each channel in the system.

With proper selection of Aj, the accuracy constant, the dynamic range of the summation is significantly reduced, allowing the use of single precision arithmetic. In cases where the channel-to-channel variation is small, $A_j$ is preferably set at a constant A which is the average of all the channels in the first view, integerized (i.e., with fractional bits removed). When channel-to-channel variation is significant, each channel of the first view is integerized and taken as the constant $A_j$ for its associated channel.

While use of the accuracy constant is important to the speed of the computation in that it allows the process to proceed in single precision arithmetic, as will be appreciated from the foregoing example, there is still much data to be processed and it is acquired at a very rapid rate. In practicing the present invention, processing and data acquisition are interleaved in the manner generally described above to allow computation of the running sum and running sum of squares for each channel through all of the acquired views in real time as the views are being acquired. It is seen that equations 6 and 7 are summations similar in form to equation 1, are non-recursive and thus are amenable to processing in accordance with the present invention. Whereas a filter term $a_k$ is not explicitly shown in equations 6 and 7, it will be appreciated that reference channels are typically provided in a CT detector and the reading from those channels used to normalize all readings for the view. Thus, each view will have a constant like $a_k$ for multiplication with $x_{i,j}$ and that constant is calculated at the time the view is acquired as an average of the reference channel readings.

In one embodiment of the invention, we prefer to use a compression factor of 4 in the real time statistical computation and to operate on four views at a time. As such, the arrays which are processed do not overlap as in the previous case.

As described above, system set-up involves the inputting of four views into an array in the array processor memory by toggling the buffers in the interface. During the course of that inputting operation, the array processor computes the accuracy constants $a_j$. After four views are acquired and while the fifth view is being input to one of the buffers in the interface, the array processor computes the running sum and running sum of squares according to equations 6 and 7 for the first quarter of the four views in the array. The parameters used in this example provide a computation time which is slightly less than 1 millisecond for that subgroup so that once processing of the subgroup is completed, the interface has the fifth view ready for transfer to an array in array processor memory. After transfer, the second quarter of the first four views is computed, a new view input, and so on until all of the data has been acquired and the running sum and running sum of squares computed for each channel. Contrary to the previous case where results were sent to the host computer periodically during processing, in the present case the running sum and running sum of squares is maintained in the array processor until the end of processing. At that time, equations 8 and 9 are used to compute the mean $\overline{X}_j$ and the standard deviation $S_j$ for each channel, and those values are sent to the host computer for display to the system operator.

In summary, what has been provided is a procedure for using a pipeline type computer like an array processor for real time processing by stopping the pipeline processing at key points in the operation geared to the acquisition rate of data, making the array processor available to receive that acquired data, then returning to the pipeline computation. The procedure continues to alternate between processing and I/O until the previously acquired data has been processed, in a way which assures that at the completion of the processing of the previously acquired data sufficient new data has been acquired to immediately resume the computation on that information.

We claim as our invention:

1. For use with a data acquisition system having a sampling interval of predetermined duration during which is acquired a set of data having N channels, a method of processing the acquired data in an array processor in real time as it is being acquired comprising the steps of:
   (a) inputting an array of p sets into the array processor memory,
   (b) processing N/m channels of the p sets where m is a compression factor greater than one,
   (c) stopping the processing to input the next acquired set into a new array,
   (d) repeating steps (b) and (c) until all N channels of the p sets are processed,
   (e) repeating steps (b), (c) and (d) on the new array until all acquired data is processed,
   and coordinating p, m and N so that the step (b) processing is completed in less time than the sampling interval.

2. The method as set out in claim 1 wherein the processing of step (b) comprises a digital filtering operation applied to the data to produce filtered outputs for each channel.

3. The method as set out in claim 1 wherein the processing step (b) comprises computing a running sum and running sum of squares of the acquired data for each channel after subtraction of an accuracy constant from the channel data, said method further comprising the step of using said running sum and running sum of squares to determine mean and standard deviation criteria for each channel.

4. In a CT scanner having a detector with N channels, a sampled data data acquisition system for producing N detector readings in a sampling interval of predetermined duration, and a computer system including an array processor for processing the data into a CT image, a method of performing digital filtering with a kernel of p terms in the array processor on the acquired data in real time as it is being acquired comprising the steps of:
   (a) inputting an array of p views into the array processor memory as they are acquired,
   (b) processing N/m channels of the p views in a time interval which is less than the sampling interval of the data acquisition system, where m is a compression factor greater than one,
   (c) stopping the processing to input the next view into a new array,
   (d) repeating steps (b) and (c) until all channels of the p views are processed, and
   (e) repeating steps (b), (c) and (d) for the new array until all views have been processed.

5. The method as set out in claim 4 wherein p is greater than m and is an integral multiple thereof, whereby the arrays in array processor memory overlap.

6. In a CT scanner having a detector with N channels, a sampled data data acquisition system for producing N detector readings in a sampling interval of predetermined duration, and a computer system including an array processor for processing the data into a CT image, a method of performing a real time statistical computations on the channel data comprising the steps of:
   (a) inputting an array of p views into the array processor memory,
   (b) computing a running sum and running sum of squares of data for N/m channels of the p views after subtracting an accuracy constant from each channel reading, and completing the running sum and running sum of squares summations for the N/m channels in a time interval which is less than the sampling interval of the data acquisition system,
   (c) stopping the processing to input the next view into a new array,
   (d) repeating steps (b) and (c) until a running sum and running sum of squares have been determined for each of the p views,
   (e) repeating steps (b), (c) and (d) for the new array until a running sum and running sum of squares have been computed for each channel for all views, and
   (f) using said running sum and running sum of squares to determine mean and standard deviation criteria for each channel.

* * * * *

UNITED STATES PATENT AND TRADEMARK OFFICE
CERTIFICATE OF CORRECTION

PATENT NO. : 4,504,909

DATED : March 12, 1985

INVENTOR(S) : Kishore C. Acharya, Thomas J. Gilbert & Terry R. Griffie

It is certified that error appears in the above-identified patent and that said Letters Patent is hereby corrected as shown below:

In the Specification:

column 4, line 17, change "10" to read -- 30 --.

Signed and Sealed this

Eighteenth Day of June 1985

[SEAL]

Attest:

DONALD J. QUIGG

Attesting Officer   Acting Commissioner of Patents and Trademarks